United States Patent
Parkvall et al.

(10) Patent No.: US 10,470,205 B2
(45) Date of Patent: Nov. 5, 2019

(54) AGRREGATION-DEPENDENT SLOT FORMAT

(71) Applicant: Telefonaktiebolaget LM Ericsson (publ), Stockholm (SE)

(72) Inventors: Stefan Parkvall, Bromma (SE); Robert Baldemair, Solna (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 16/371,593

(22) Filed: Apr. 1, 2019

(65) Prior Publication Data

US 2019/0230687 A1 Jul. 25, 2019

Related U.S. Application Data

(63) Continuation of application No. 16/328,607, filed as application No. PCT/EP2016/072950 on Sep. 27, 2016.

(51) Int. Cl.
*H04W 72/14* (2009.01)
*H04W 72/12* (2009.01)
*H04W 72/04* (2009.01)
*H04L 5/14* (2006.01)
*H04W 88/02* (2009.01)

(52) U.S. Cl.
CPC ........ *H04W 72/1263* (2013.01); *H04L 5/1469* (2013.01); *H04W 72/042* (2013.01); *H04W 72/0446* (2013.01); *H04W 88/023* (2013.01)

(58) Field of Classification Search
CPC .................. H04W 72/1263; H04W 72/1289
See application file for complete search history.

(56) References Cited

U.S. PATENT DOCUMENTS

| | | | |
|---|---|---|---|
| 2009/0034446 A1* | 2/2009 | Adams | H04W 28/06 370/314 |
| 2017/0201968 A1* | 7/2017 | Nam | H04W 4/70 |
| 2017/0244535 A1* | 8/2017 | Islam | H04B 7/2615 |
| 2017/0366311 A1* | 12/2017 | Iyer | H04B 7/0482 |
| 2018/0035459 A1* | 2/2018 | Islam | H04L 1/16 |
| 2018/0063865 A1* | 3/2018 | Islam | H04W 76/27 |
| 2019/0007152 A1* | 1/2019 | Yi | H04L 5/0007 |

FOREIGN PATENT DOCUMENTS

| WO | 2006122142 A1 | 11/2006 |
|---|---|---|
| WO | 2016053844 A1 | 4/2016 |

OTHER PUBLICATIONS

International Search Report and Written Opinion dated Jul. 4, 2017, for International Application No. PCT/EP2016/072950 filed on Sep. 27, 2016, consisting of 11-pages.
3GPP TR 45.912 V13.0.0; 3rd Generation Partnership Project; Technical Specification Group GSM/EDGE Radio Access Network; Feasibility study for evolved GSM/EDGE Radio Access Network (GERAN)(Release 13); Dec. 2015, consisting of 517-pages.

* cited by examiner

*Primary Examiner* — Zhiren Qin
(74) *Attorney, Agent, or Firm* — Christopher & Weisberg, P.A.

(57) ABSTRACT

The present disclosure pertains to a radio node for a Radio Access Network. The radio node is adapted for communicating in the Radio Access Network based on a scheduled slot aggregation comprising a plurality of slots, wherein a slot format of at least one slot of the slot aggregation is adapted based on a structure of the slot aggregation. The disclosure also pertains to related methods and devices.

9 Claims, 6 Drawing Sheets

AGRREGATION-DEPENDENT SLOT FORMAT

CROSS-REFERENCE TO RELATED APPLICATIONS

This application is a continuation of U.S. application Ser. No. 16/328,607 filed on Feb. 26, 2019, which is a U.S. National Stage of International Application No. PCT/EP2016/072950, filed on Sep. 27, 2016 the entireties of both of which are incorporated herein by reference.

TECHNICAL FIELD

This disclosure pertains to wireless communication technology, in particular to Radio Access Network (RAN) technology.

BACKGROUND

For new (in particular, 5$^{th}$ Generation or 5G) wireless communication networks, new approaches to cover different and growing use cases are developed. In particular, new and more flexible transmission time intervals (TTI) and/or timescales for scheduled communication are being discussed. Increased flexibility might lead to an undesirable amount of signaling overhead, in particular related to control information.

SUMMARY

It is an object of this disclosure to provide approaches allowing flexible transmission scheduling while facilitating limited signaling overhead.

Accordingly, there is described a radio node for a Radio Access Network (RAN). The radio node is adapted for communicating in the Radio Access Network based on a scheduled slot aggregation comprising a plurality of slots. A slot format of at least one slot of the slot aggregation is adapted based on a structure of the slot aggregation. The radio node may comprise a communicating module for such communicating. It may be considered that the radio node comprises an adapting module for adapting the slot format.

There is also described a method for operating a radio node in a Radio Access Network. The method comprises communicating in the Radio Access Network based on a scheduled slot aggregation comprising a plurality of slots, wherein a slot format of at least one slot of the slot aggregation is adapted based on a structure of the slot aggregation.

With adapting the slot format based on a structure of the slot aggregation, the slot format may be chosen is a suitable way, e.g. to limit overhead.

A radio node may generally be implemented as a network node or a terminal. Communicating in the RAN may comprise uplink and/or downlink transmission (or sidelink transmission, e.g. between terminals) utilizing the RAN and/or associated RAT, respectively the reception of such transmission.

A slot aggregation may generally comprise at least two slots having different prescribed durations.

It may be considered that a slot format indicates one or more time and/or frequency (or time-frequency) resources scheduled for control information and/or one or more time and/or frequency (or time-frequency) resources scheduled for data. In particular, the slot format may indicate the arrangement of the resource/s within the slot, respectively a time-frequency grid defined and/or determined by the slot.

The structure of the slot aggregation may represent and/or indicate an order of the slots of the slot aggregation, in particular an order in time. The slots may be arranged to be consecutive and/or successive in time, e.g., such that a border of a slot in time abuts a border of another slot of the slot aggregation. The structure may generally assign a position (in time and/or sequence) for or to each slot in the slot aggregation.

Advantageously, the slot format may be adapted based on a density of control information of the slot aggregation. The density is a good measure of control information and potential overhead. Alternatively or additionally, the slot format may be adapted based on a number of resources (e.g., resource elements) scheduled for control information within a time interval covering more than one slot (or mini-slot).

Alternatively or additionally to the variants described above, there may generally be considered a radio node, in particular a network node, adapted for configuring a second radio node, in particular a terminal, for communicating with a slot format adapted based on the structure of a scheduled slot aggregation. The scheduled slot aggregation may be a slot aggregation scheduled and/or configured for the second radio node. The radio node may comprise a configuring module for such configuring. There may also be considered a method for operating a radio node in a RAN, the method comprising configuring a second radio node, in particular a terminal, for communicating with a slot format adapted based on the structure of a scheduled slot aggregation.

There may also be considered a program product comprising instructions adapted for causing control circuitry to perform and/or control any one method or any combination of methods described herein.

A storage medium storing a program product as described herein and/or instructions adapted for causing control circuitry to perform and/or control any one method or any combination of methods described herein is also proposed.

BRIEF DISCUSSION OF THE DRAWINGS

The drawings are provided to illustrate concepts and approaches described herein, and are not intended to limit their scope. The drawings comprise.

DETAILED DESCRIPTION

In the context of this disclosure, communicating may comprise transmitting and/or receiving, in particular of wireless and/or radio signaling in or of the RAN. Transmitting based on a scheduled slot aggregation may comprise transmitting using the associated (adapted) slot format, e.g. such that the transmission utilizes the slot format(s). Receiving based on a scheduled slot aggregation may comprise assuming that a received transmission follows the format(s) associated to the slot aggregation, in particular utilizes the adapted slot format for the associated slot(s). Signaling may generally comprise one or more symbols being transmitted.

Transmitting, e.g. from a network node, to a terminal may be considered downlink transmission, transmitting, e.g. from a terminal, to a network node may be considered uplink transmission.

A slot may generally represent any time-structure, in particular time-frequency structure, with a pre-defined duration (length in time or time interval), for which in particular time-frequency resources for communication may be scheduled for at least one, and/or specifically for one, radio node. A slot may, for example, cover or comprise a number of symbols (e.g., 7) and a number of frequency bands, e.g. subcarriers (e.g., 12). The numbered examples here can pertain to LTE, other examples, e.g. for other 5G technologies may be considered. A mini-slot, which may comprise or cover less symbols than a slot, e.g. 6 or 5 or fewer symbols, may be considered to be an example of a slot. It may generally be considered that slots in a slot aggregation, even if having different durations, may cover the same frequency range (e.g., carrier/s and/or subcarrier/s). A slot or type of slots may be limited to begin and/or end at specific points in time or at specific symbols numbers (e.g., it may be prescribed that a slot may only begin at symbols with specific periodicity, e.g. every Nth or Mth symbol). Alternatively or additionally, there may be considered slots with arbitrary beginning and/or ending (e.g., types of mini-slots). Such slot characteristics may be defined by a standard.

Both slots and mini-slots (or different structures) may be considered examples of slots, with a mini-slot having shorter duration (comprising or covering a lower number of symbols) than an associated slot. A symbol may generally correspond to an OFDMA (Orthogonal Frequency Division Multiple Access) symbol, e.g. in downlink (respectively in some cases, e.g. for LTE, an SC-FDMA, Single Carrier Frequency Division Multiple Access, symbol). However, the approaches described herein are not limited to specific multiplexing technologies and may also be implemented e.g. for Code Division Multiple Access (CDMA) or Time Division Multiple Access (TDMA) technologies. A slot (respectively mini-slot) may be a slot (respectively mini-slot) as defined for 3GPP 5G technology, in particular NR.

A slot format may indicate and/or define the characteristics of a slot, in particular pertaining to the presence and/or position of control information relative to the slot, e.g. regarding which resource/s are to be used for control information. A slot format may also define other characteristics, e.g. duration and/or number of symbols and/or type of symbols (e.g., regarding cyclic prefix), and/or which frequency range is covered (for example, in terms of subcarriers), etc. In particular, a slot format may define which time-frequency resource(s) of a slot are assigned or allocated or to be used for control information and/or data. The slot format may indicate the arrangement of such resource(s) within the slot, e.g. in relation to a time-frequency resource grid associated to the slot, which may represent the individual resources of the slot (e.g., a grid of subcarriers over symbols of the slot, which may cover a number of total individual resources of number of symbols×number of subcarrier/frequency bands). A slot format may be associated to a slot, in particular a slot of the slot aggregation and/or having a specific duration.

Control information may generally comprise information and/signaling pertaining to the communication process, e.g. reference signaling (e.g., sounding signaling for uplink, or pilot signaling and/or cell specific reference signaling and/or user specific reference signaling, for downlink), and/or scheduling information (e.g., resource and/or scheduling assignment and/or request) and/or feedback (e.g., HARQ feedback, and/or measurement feedback on received reference signaling). Examples for downlink reference signaling comprise demodulation reference signaling like DMRS (De-Modulation Reference Signaling) and CSI-RS (Channel State Information-Reference Signaling).

Generally, control information in downlink may comprise downlink control information like Downlink Control Information, DCI, according to 3GPP standards, e.g. LTE. Control information in uplink may comprise uplink control information, e.g. Uplink Control Information, UCI, according to 3GPP standards, e.g. LTE. Control information may in particular pertain to information of one or more radio layers of communication, in some variants physical layer information. The above examples pertain to uplink and downlink control information. Data may generally comprise any kind of data, in particular user data and/or payload data. Data may pertain to information from higher layers, in particular above the radio and/or physical layer/s.

A time-frequency resource (resource) may represent a specific frequency and/or frequency band and/or carrier and/or subcarrier for communicating, associated to a specific time interval. An individual resource may also be referred to as resource element (e.g., a Resource Element, RE, according to 3GPP standards). The time interval may be a time interval for a single symbol and/or for transmission of commonly modulated bits of data. Resource(s) may generally comprise one or more of such time-frequency resources. It may be considered that resources are arranged in groups or blocks, e.g. comprising a plurality of frequencies (or frequency bands) and/or subcarriers, which may be continuously abutting.

Adapting a slot format may comprise selecting and/or setting the slot format. For different slots of a slot aggregation, different slot formats may be adapted and/or selected. Adapting a slot format may in particular refer to selecting and/or setting one format out of a plurality of available formats for the associated slot. The slot format(s) may be predefined, e.g. stored in a memory of the radio node. A slot format being adapted based on the structure of the slot aggregation may refer to such adapting having been performed on or for the associated slot. Which slot format is adapted or selected may be defined based on the structure of the slot aggregation.

Adapting the slot format based on a structure of a slot aggregation may comprise adapting and/or selecting the slot format based on an indication of the slot aggregation and/or structure thereof. Such an indication may comprise any information indicating the slot aggregation, e.g. an index and/or information provided when configuring, and/or scheduling information and/or one or more suitable parameters. The indication may indicate, implicitly and/or explicitly, the number of slots, and/or the positioning (on which resource/s) and/or presence of control information in one or more or each of the slots of the slot aggregation.

It may be considered that adapting a slot format comprises reading from a memory, and/or a table, which may be in a memory, which slot format to use for a slot (or for each slot) in a scheduled slot aggregation. Generally, there may be considered utilizing one or more maps or functions mapping slot format/s for one or more slots to one or more (possible) slot aggregations, based on which adapting a slot format may be performed. It may be considered that a slot aggregation represents its structure, thus such mapping represents adapting a slot format based on a structure of the slot aggregation.

Adapting a slot format may generally comprise setting the slot format, e.g. setting and/or arranging and/or controlling the positioning of control information in the slot. Slot formats may generally (for slots of the same duration/covering or comprising the same number of symbols) differ regarding the position of control information within the associated slot. For different slot formats, the control information may be (relative to the slot or grid) shifted, for example to the middle or the end, and/or allocated fewer resources (e.g., covering only the first symbol instead of two or three symbols). In some cases, an adapted slot format may define that no reference signaling and/or no control signaling, or nor control information, is to be in the slot.

It may be considered that an adapted slot format defines that specific kind/s of control information is to be omitted/not transmitted or not included in the slot. Kinds of control signaling may comprise e.g. specific kinds of reference signaling (e.g., cell-specific and/or user-specific reference signaling (for example channel state information reference signaling or demodulation reference signaling), or sounding signaling (in uplink), for example CSI-RS and/or DMRS or similar in downlink, or SRS (Sounding Reference Signaling) in uplink) and/or specific kinds of control signaling, e.g. DCI or UCI, in particular scheduling information and/or feedback, e.g. measurement feedback or HARQ feedback. Alternatively or additionally, an adapted slot format may define which kinds of control information is to be transmitted or included in a slot.

The structure of the slot aggregation may generally be represented and/or indicated by corresponding information, e.g. one or more indexes and/or parameters, and/or one or more tables, which may be indicated or indexed. Such information may be control information, e.g. comprised in scheduling information. In some variants, adapting the slot format based on the structure of the slot aggregation may be based on receiving information (e.g., control information), indicating which slot format/s to use. A radio node may be adapted to transmit such indication, and/or to receive such indication. The structure of a slot aggregation may for example indicate and/or represent the number of slots, and/or the type of slots, and/or order or sequence of slots in time, and/or the length (duration and/or number of symbols) of the slots, and/or position or presence of control information in the slots.

A scheduled slot aggregation may be a slot aggregation scheduled for communicating, in particular for the radio node. The scheduled slot aggregation may be scheduled by the RAN, e.g. the radio node, in particular if it is a network node. It may be considered that the scheduled slot aggregation is configured to the radio node, e.g. if the radio node is a terminal, or a network node receiving scheduling from a different node of the network or RAN. It may generally be considered that a slot aggregation is configured or scheduled at once and/or with one scheduling decision and/or with one scheduling assignment or message (e.g., DCI message).

The slots may be consecutive. It may be considered that a scheduled slot aggregation pertains to communicating for one radio node respectively for one communication link. The radio node may use the slots of the slot aggregation for communicating with one communication partner (e.g., a network node with one terminal, or a terminal with one network node).

Configuring a scheduled slot aggregation (and/or a slot format) may comprise transmitting corresponding information (e.g., indicating the slot aggregation) to the radio node that is being configured, e.g. allocation data and/or scheduling data, e.g. in form of a scheduling assignment or configuration message or downlink control information (e.g. Downlink Control Information according to a format defined in 3GPP standards, e.g. according to LTE).

A radio node may generally be a radio node for or in a RAN. A radio node, like a network node or a terminal adapted for corresponding control functionality, may be adapted to schedule the slot aggregation and/or to provide and/or indicate and/or configure a scheduled slot aggregation. The radio node may comprise a scheduling module for such scheduling. It may alternatively be considered that a radio node, in particular a terminal, is adapted to be configured with a scheduled slot aggregation, and/or to receive an indication or signaling representing or indicating or comprising a scheduled slot aggregation.

The radio node may comprise an associated receiving module. The scheduled slot aggregation may be configured by the network and/or another radio/network node, which may comprise a corresponding configuring module. A scheduled slot aggregation may indicate to the radio node that the slots of the slot aggregation are intended to be used for communicating. For example, a radio node may transmit during the scheduled slot aggregation, or receive (or be prepared to receive). It may be considered that for some scheduled slot aggregations, the radio node uses the slots for both transmitting and receiving (for example, Time Division Duplexing, TDD, and/or switching between uplink and downlink within the slot aggregation or between slots in other technologies).

A radio node may generally be any node, like a network node, of or for a RAN adapted for wireless and/or radio communication, and/or any node adapted to communicate with or within a RAN, e.g. a terminal. A radio node or network node in particular may be a base station and/or relay node and/or micro-(or nano-, pico- or femto-) node, or terminal adapted for providing corresponding functionality. A terminal may be any device suitable as end device for communication utilizing the RAN, e.g. a user equipment, mobile phone, smartphone, tablet, computer, sensor equipment with communicating functionality, vehicular communication device, device adapted for Machine-Type Communication (MTC), etc. A terminal may be mobile, or in some variants stationary (e.g. sensory equipment). A RAN may in particular comprise and/or implement 5G technology, e.g. according to 3GPP standard, in particular sufficiently advanced LTE and/or Next Radio (NR), or successor/s. A network node may in particular be a base station like an eNodeB Control information may generally comprise reference signaling (RS) and/or control signaling (ctrl, e.g. uplink respectively downlink control information, e.g. scheduling and/or power control information, and/or feedback, e.g. UCI and/or DCI).

For a RAN (respectively RAT, Radio Access Technology, the technology associated to a RAN), e.g. NR, as an example for upcoming network technologies, there may be defined different kinds of slots (different in particular in terms of duration/number of symbols covered), e.g. slots and mini-slots. For example:

Slots may cover or comprise N (OFDM) symbols in duration and may only start at every N:th (OFDM) symbol; and Mini-slots may cover or comprise fewer than N (OFDM) symbols in length and can start at any (OFDM) symbol (or at least more often than every N:th (OFDM) symbol).

A slot (and mini-slot) format can be used to define the relative placement of control information like reference signals and control signaling and data within a slot. One solution is to place control information like reference signals and control signaling at the beginning of the slot (e.g., for the first 1, 2 or 3 symbols), followed by data in the remainder of the slot.

Aggregation of slots to a slot aggregation can be used to create longer transmission durations than N OFDM symbols (respectively, the duration of one slot).

Aggregation of a mini-slot followed by one or more slots are useful in, e.g., unlicensed spectrum, in order to allow transmissions to start as soon as possible after a successful LBT (Listen-Before-Talk), instead of waiting for a slot boundary or for rapid start of transmission for latency-critical data not fitting into a single mini-slot. Other use cases of a mini-slot are relaxed network node like an eNB (eNodeB, a base station for 3GPP, in particular LTE) synchronization requirements, where it can be useful to have a guard period at the beginning of a DL (downlink) period.

Figure 1:
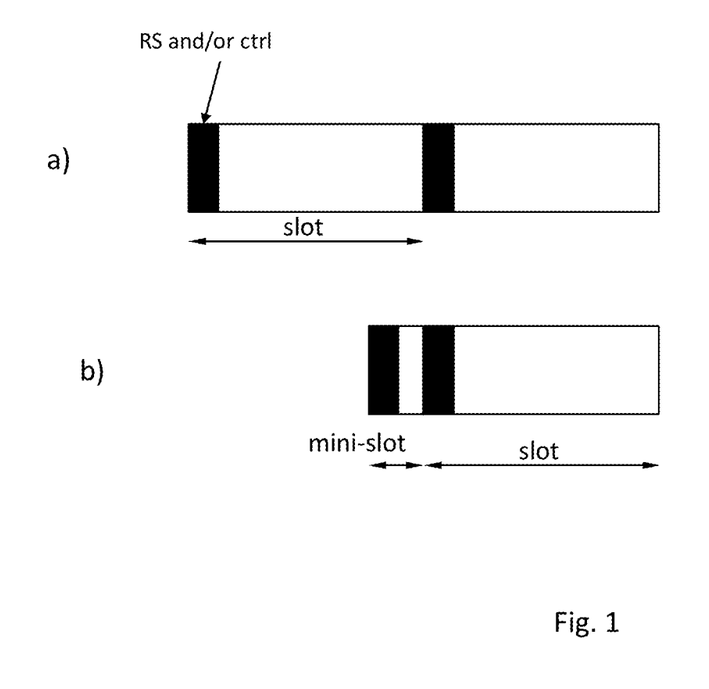
FIGS. 1a and 1b, showing exemplary slot aggregations.

FIG. 1a shows an example of two consecutive slots with control information like reference signals (RS) and/or control signaling (ctrl, e.g., UCI or DCI) at the beginning of the respective slot.

Aggregating a mini-slot to a slot to form a slot aggregation of the slot following the mini-slot can result in unnecessary dense reference signals (or even control) as shown in FIG. 1b.

The (adapted) slot format used for a slot may generally depend on the slot format for the preceding (in the slot aggregation) slot or mini-slot. In some cases, the (adapted) slot format may alternatively or additionally depend on the succeeding slot/s of the slot aggregation.

The term 'slot format' is used herein to describe one or more properties of a slot (or mini-slot), for example the placement in time and/or frequency domain of control information, e.g. reference symbols, control signals, handling of feedback information such as hybrid-ARQ acknowledgements, the set of OFDM symbols in the slot used for data transmission, the length of a mini-slot, etc. As an example, one could envision a slot format A including downlink control signaling and reference signals at the beginning, while slot format B has neither reference signals nor control signaling at the beginning of the slot. Additional slot formats can easily be defined as applicable.

The slot format used (another term for adapted in this context) for a slot depends in some cases on the slot format of the preceding slot or mini-slot. For example, from the receiver perspective, if the mini-slot immediately before the slot is shorter than M OFDM symbols, no demodulation reference signals are inserted in the following slot, at least not in the beginning of the following slot, otherwise reference signals are included in the slot. Similarly, no preceding slot or mini-slot intended for the same receiver may imply that the following slot has downlink control signaling in contrast to a slot with a preceding (mini-)slot for the same receiver.

Figure 2:
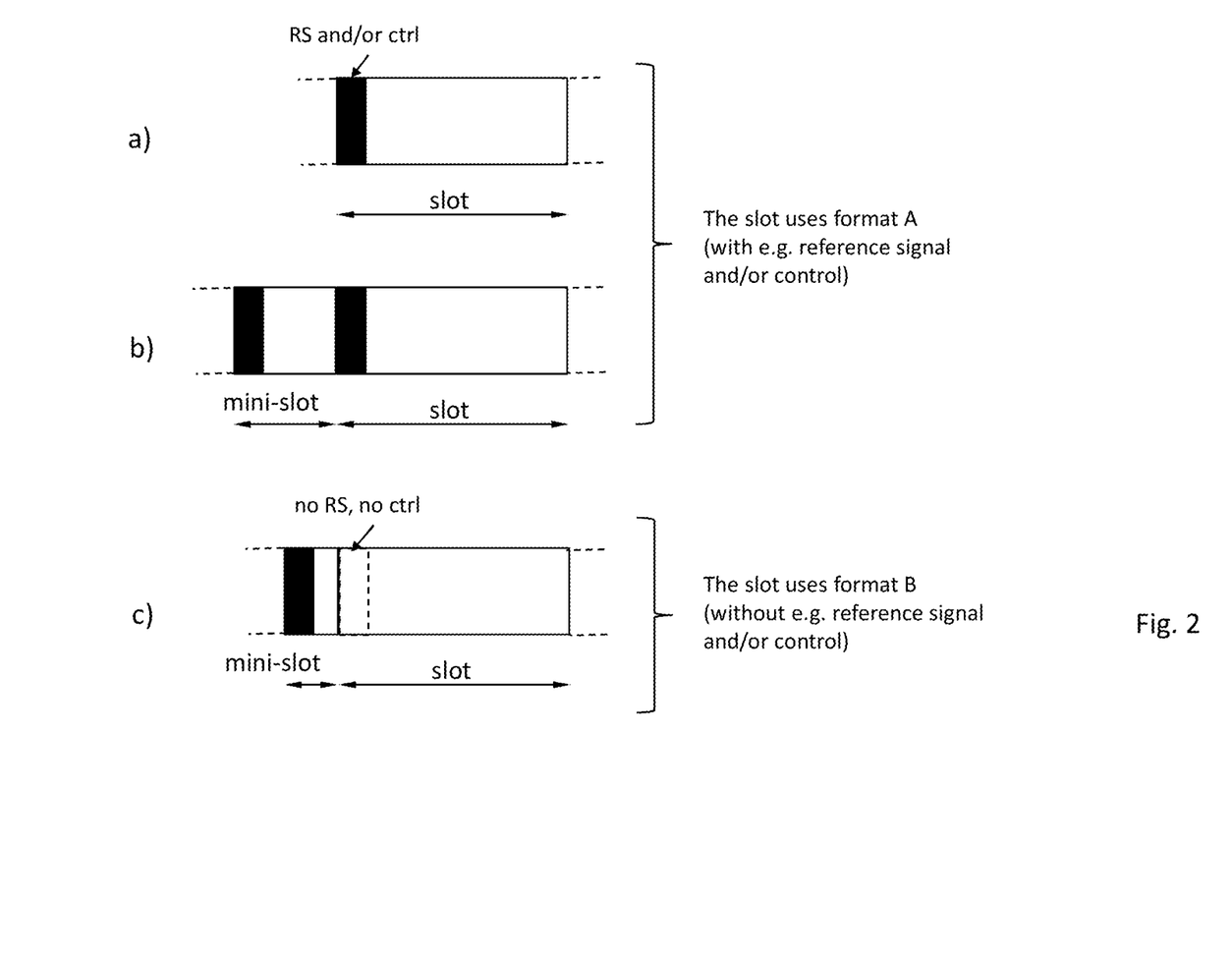
FIGS. 2a, 2b and 2c, showing exemplary slot formats.

FIGS. 2 a) and 2 b) show examples of a slot (a) and slot aggregation (b) in which the slots (mini-slot and slot) use a format A with control information. FIG. 2 c) shows an example of a slot aggregation in which the second slot (the slot following the mini-slot) has a slot format B adapted to the slot structure such that it does not contain control information. The density of control information in this slot aggregation is clearly lower than the one shown in FIG. 2 b).

Figure 3:
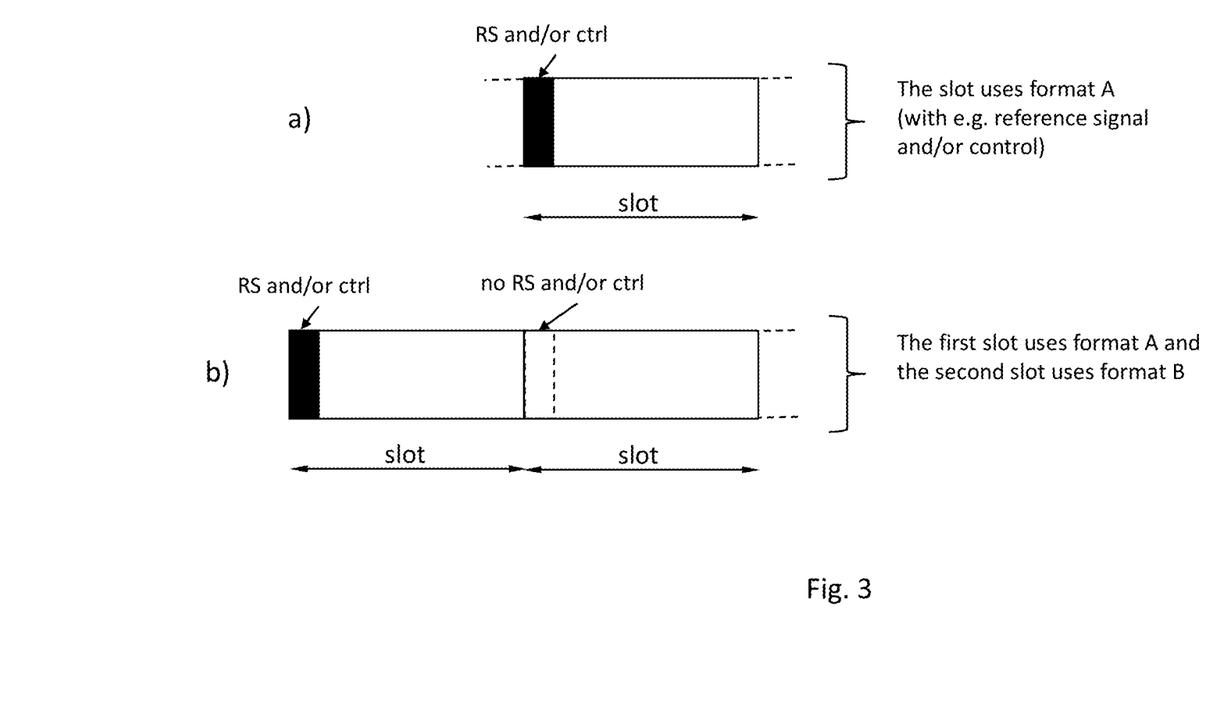
FIGS. 3a and 3b, showing further exemplary slot formats.

FIG. 3 a) shows another example of a slot using format A as above. FIG. 3 b) shows an example of a slot aggregation comprising two slots having the same length, in which the first slot uses format A and the second slot format B, without control information.

Figure 4:
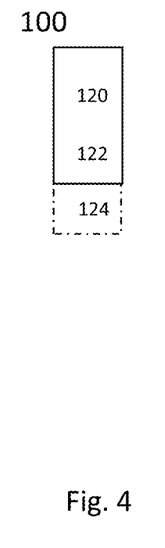
FIG. 4, showing a schematic of an exemplary radio node.

FIG. 4 schematically shows a radio node 100, which in particular may be a network node like an eNodeB, or a terminal. Radio node 100 comprises control circuitry 120, which may comprise a (or more than one) controller connected to a memory arrangement with at least one memory. Any module of a radio node, e.g. a communicating and/or receiving module and/or transmitting module and/or configuring module and/or scheduling module, may be implemented in and/or executable by the radio node 100, in particular the control circuitry 120. The control circuitry 120 is connected to control radio circuitry 122 of the radio node 100, which provides receiver and transmitter and/or transceiver functionality. An antenna circuitry 124 may be connected or connectable to radio circuitry 122 for signal reception or transmittance and/or amplification. The radio node 100 may be adapted to carry out any of the methods for operating a radio node disclosed herein; in particular, it may comprise corresponding circuitry, e.g. control circuitry.

Figure 5:
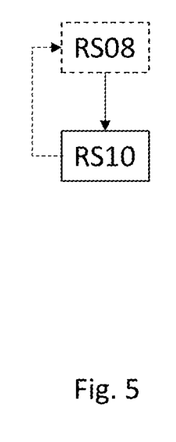
FIG. 5, showing a flowchart of an exemplary method for operating a radio node.

FIG. 5 shows a flowchart of an algorithm of an exemplary method for operating a radio node. The method comprises an action RS10 of communicating in the Radio Access Network based on a scheduled slot aggregation comprising a plurality of slots, wherein a slot format of at least one slot of the slot aggregation is adapted based on a structure of the slot aggregation. The method may optionally comprise an action RS08 of scheduling the slot aggregation for communication, and/or configuring a second radio node with the scheduled slot aggregation. Alternatively, action RS08 may comprise receiving an indication of the scheduled slot aggregation. RS10 may be performed based on RS08. After RS10, the algorithm may loop back to RS08 or RS10, or stop.

Figure 6:
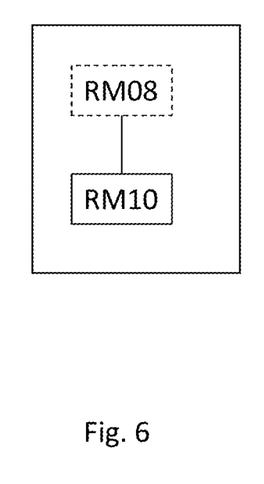
FIG. 6, showing another schematic of an exemplary radio node.

FIG. 6 shows another exemplary radio node, which may be adapted according to the radio node of FIG. 4 and/or to perform the method of FIG. 5. The radio node may comprise a communicating module RM10 for performing action RM08. Optionally, the radio node may comprise a scheduling and/or configuring, or a receiving module, for performing a corresponding action RS08.

There may be considered a radio node adapted for performing any one of the methods for operating a radio node described herein.

There may be considered a terminal or user equipment adapted for performing any one of the methods for operating a radio node described herein.

There is also disclosed a program product comprising code executable by control circuitry, the code causing the control circuitry to carry out and/or control any one of the method for operating a radio node as described herein, in particular if executed on control circuitry, which may be control circuitry of a user equipment or a network node.

Moreover, there is disclosed a carrier (or storage) medium arrangement carrying and/or storing at least any one of the program products described herein and/or code executable by control circuitry, the code causing the control circuitry to perform and/or control at least any one of the methods described herein. A carrier medium arrangement may comprise one or more carrier media. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A terminal may be implemented as a user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or a user equipment is adapted for one or more RATs, in particular LTE/E-UTRA. A terminal or user equipment may generally be proximity services (ProSe) enabled, which may mean it is D2D capable or enabled. It may be considered that a terminal or user equipment comprises radio circuitry and/control circuitry for wireless communication. Radio circuitry may comprise for example a receiver device and/or transmitter device and/or transceiver device. Control circuitry may include one or more controllers, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN. Reference signaling in the uplink may be associated to a terminal, e.g. SRS.

A radio node or network node or base station may be any kind of radio node or base station of a wireless and/or cellular network adapted to serve one or more terminals or user equipments. It may be considered that a base station is a node or network node of a wireless communication network. A radio node or network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or radio node is adapted for one or more RATs, in particular LTE/E-UTRA. Radio circuitry may comprise for example a receiver device and/or transmitter device and/or transceiver device. Control circuitry may include one or more controllers, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled.

An eNodeB (eNB) may be envisioned as an example of a radio node or base station, e.g. according to an LTE standard. A radio node or base station may generally be proximity service enabled and/or to provide corresponding services. It may be considered that a radio node base station is configured as or connected or connectable to an Evolved Packet Core (EPC) and/or to provide and/or connect to corresponding functionality. The functionality and/or multiple different functions of a radio node or base station may be distributed over one or more different devices and/or physical locations and/or nodes. A radio node or base station may be considered to be a node of a wireless communication network. Generally, a radio node or base station may be considered to be configured to be a coordinating node and/or to allocate resources in particular for cellular communication between two nodes or terminals of a wireless communication network, in particular two user equipments.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

What is claimed is:

1. A method for operating a user equipment in a 5G New Radio (NR) Radio Access Network, the method comprising:
   receiving a configuration message configuring a slot aggregation;
   receiving data signaling based on a scheduled slot aggregation, the scheduled slot aggregation having a structure comprising a plurality of consecutive slots, each slot of the structure of the scheduled slot aggregation having the same duration of N symbols and having a slot format representing time resources in the slot scheduled for reception of data signaling;
   a slot format of at least one slot of the slot aggregation being adapted based on the structure of the scheduled slot aggregation and an indication of the slot aggregation being scheduled, the indication being provided in a Downlink Control Information, DCI, scheduling assignment;
   the reception of data signaling being based on the structure of the scheduled slot aggregation and the adapted slot format of the at least one slot of the slot aggregation; and
   the slots of the scheduled slot aggregation being used in Time Division Duplex operation.

2. The method according to claim 1, wherein the adapted slot format depends on the slot format of the preceding slot.

3. The method according to claim 1, wherein the slot format indicates resources allocated for at least one of control information and data.

4. A user equipment for a 5G New Radio (NR) Radio access network, the user equipment comprising control circuitry and radio circuitry, the user equipment being configured to utilize the control circuitry and radio circuitry to:
   receive a configuration message configuring a slot aggregation;
   receive data signaling based on a scheduled slot aggregation, the scheduled slot aggregation having a structure comprising a plurality of consecutive slots, each slot of the structure of the scheduled slot aggregation having the same duration of N symbols and having a slot format representing time resources in the slot scheduled for reception of data signaling;
   a slot format of at least one slot of the slot aggregation being adapted based on the structure of the scheduled slot aggregation and an indication of the slot aggregation being scheduled, the indication being provided in a Downlink Control Information, DCI, scheduling assignment;
   the reception of data signaling being based on the structure of the scheduled slot aggregation and the adapted slot format of the at least one slot of the slot aggregation; and
   the slots of the scheduled slot aggregation being used in Time Division Duplex operation.

5. The user equipment according to claim 4, wherein the adapted slot format depends on the slot format of the preceding slot.

6. The user equipment according to claim 4, wherein the slot format indicates resources allocated for at least one of control information and data.

7. A network node for a Radio Access Network, the network node comprising control circuitry and radio circuitry and being configured to utilize the control circuitry and the radio circuitry to:
   configure a user equipment with a slot aggregation;
   transmit a Downlink Control Information, DCI, scheduling assignment comprising an indication of a slot aggregation being scheduled;
   transmit data signaling based on the scheduled slot aggregation, the scheduled slot aggregation having a structure comprising a plurality of consecutive slots, each slot of the structure of the scheduled slot aggregation having the same duration of N symbols and having a slot format representing time resources in the slot scheduled for transmission of data signaling;
   a slot format of at least one slot of the slot aggregation being adapted based on the structure of the scheduled slot aggregation and the indication of the slot aggregation being scheduled;
   the transmission of data signaling being based on the structure of the scheduled slot aggregation and the adapted slot format of the at least one slot of the slot aggregation; and
   the slots of the scheduled slot aggregation being used in Time Division Duplex operation.

8. The network node according to claim 7, wherein the adapted slot format depends on the slot format of the preceding slot.

9. The network node according to claim 7, wherein the slot format indicates resources allocated for at least one of control information and data.

* * * * *

UNITED STATES PATENT AND TRADEMARK OFFICE
CERTIFICATE OF CORRECTION

PATENT NO. : 10,470,205 B2  
APPLICATION NO. : 16/371593  
DATED : November 5, 2019  
INVENTOR(S) : Parkvall et al.

Page 1 of 1

It is certified that error appears in the above-identified patent and that said Letters Patent is hereby corrected as shown below:

On the Title Page

Item (54), in Title, in Column 1, Line 1, delete "AGRREGATION-DEPENDENT" and insert
-- AGGREGATION-DEPENDENT --, therefor.

In the Specification

In Column 1, Line 1, delete "AGRREGATION-DEPENDENT" and insert
-- AGGREGATION-DEPENDENT --, therefor.

In Column 1, Line 53, delete "chosen is" and insert -- chosen in --, therefor.

In Column 2, Line 45, delete "showing" and insert -- showing an --, therefor.

In Column 2, Line 46, delete "showing" and insert -- showing an --, therefor.

In Column 2, Lines 48-49, delete "node; and" and insert -- node; --, therefor.

In Column 4, Line 19, delete "resource (resource)" and insert -- resource --, therefor In Column 5, Line 17, delete "(e.g.," and insert -- e.g., --, therefor.

In Column 5, Line 22, delete "in uplink)" and insert -- (in uplink) --, therefor.

Signed and Sealed this  
Fifteenth Day of December, 2020

Andrei Iancu  
*Director of the United States Patent and Trademark Office*